United States Patent
Ghosh et al.

(10) Patent No.: US 11,461,725 B2
(45) Date of Patent: Oct. 4, 2022

(54) METHODS AND SYSTEMS FOR ANALYZING AGGREGATE OPERATIONAL EFFICIENCY OF BUSINESS SERVICES

(71) Applicant: Conduent Business Services, LLC, Dallas, TX (US)

(72) Inventors: Rahul Ghosh, Bangalore (IN);
Avantika Gupta, Vrindavan (IN);
Soumi Chattopadhyay, Kolkata (IN);
Ansuman Banerjee, Kolkata (IN);
Koustuv Dasgupta, Bangalore (IN);
Ashish Garg, Ghaziabad (IN)

(73) Assignee: Conduent Business Services, LLC, Florham Park, NJ (US)

(*) Notice: Subject to any disclaimer, the term of this patent is extended or adjusted under 35 U.S.C. 154(b) by 1567 days.

(21) Appl. No.: 15/193,143

(22) Filed: Jun. 27, 2016

(65) Prior Publication Data

US 2017/0372248 A1    Dec. 28, 2017

(51) Int. Cl.
*G06Q 10/06* (2012.01)

(52) U.S. Cl.
CPC ............... *G06Q 10/06393* (2013.01)

(58) Field of Classification Search
CPC ................................. G06Q 10/06393
USPC ............................................. 705/7.39
See application file for complete search history.

(56) References Cited

U.S. PATENT DOCUMENTS

| | | | |
|---|---|---|---|
| 7,996,252 B2 | 8/2011 | Shahrabi et al. | |
| 2011/0061013 A1* | 3/2011 | Bilicki | G06Q 10/06 715/771 |
| 2014/0220998 A1 | 8/2014 | Kovacs et al. | |
| 2014/0344086 A1 | 11/2014 | Pasta | |
| 2016/0103888 A1* | 4/2016 | Fletcher | H04L 41/5009 707/722 |

FOREIGN PATENT DOCUMENTS

EP    247869 A1    8/2012

OTHER PUBLICATIONS

How does Your Service Desk Stack Up? The Seven Most Important Performance Indicators for the Service Desk by Jeff Rumburg and Eric Zbikowski (Year: 2013).*

(Continued)

*Primary Examiner* — Alan Torrico-Lopez
(74) *Attorney, Agent, or Firm* — Jones Robb, PLLC

(57) ABSTRACT

Embodiments of the present disclosure disclose methods and systems for generating operational alarms for a plurality of clients, the operational alarms being generated by a business performance system, each client being associated with a plurality of Key Performance Indicators (KPIs). An aggregate rank for each client based on ranks of each KPI is generated. For each client: the aggregate rank of the client over one or more time periods is monitored. If the aggregate rank deteriorates over the one or more time periods, a severity indicator is determined based on change of value of each KPI and change of rank of each KPI for the client over the one or more time periods. An operational alarm based on value of the severity indicator is determined. The operational alarm is displayed on a user interface, wherein the operational alarm displays one or more KPIs with highest severity values.

21 Claims, 15 Drawing Sheets

(56) References Cited

OTHER PUBLICATIONS

An Analysis of Rank Aggregation Algorithms, Gattaca Lv (Year: 2014).*

M. Khan, J. Manoj, A. Singh, and J. Blumenstock, "Behavioral modeling for churn prediction: Early indicators and accurate predictors of custom defection and loyalty," in IEEE Big Data Congress, 2015.

L. Barakat, P. Taylor, N. Griffiths, and S. Miles, "Context-driven assessment of provider reputation in composite provision scenarios," in ICSOC, 2015.

R. Ranchal, A. Mohindra, N. Zhou, S. Kapoor, and B. Bhargava, "Hierarchical aggregation of consumer ratings for service ecosystem," in ICWS, 2015.

L. Qu, Y. Wang, M. Orgun, L. Liu, and A. Bouguettaya, "Contextaware cloud service selection based on comparison and aggregation of user subjective assessment and objective performance assessment," in ICWS, 2014.

R. Copeland and N. Crespi, "Classifying and Aggregating Context Attributes for Business Service Requests—No One-Size-Fits-All," in IEEE Big Data, 2014.

N. Zhou, W. Gifford, K. Ratakonda, G. Westerwick, and C. Engel, "On the quantification of global team performance and profitability," in SCC, 2014.

H. Nehzad, D. Greenia, T. Nakamura, and R. Akkiraju, "Health identification and outcome prediction for outsourcing services based on textual comments," in SCC, 2014.

K. Fletcher, X. Liu, and M. Cheng, "Aggregating ranked services for selection," in SCC, 2014.

L. Qu, Y. Wang, and M. Orgun, "Cloud service selection based on the aggregation of user feedback and quantitative performance assessment," in SCC, 2013.

P. Velaso-Elizondo, "Aggregate QoS Estimation of Service Compositions—An Analysis of Pattern-oriented Approaches," 2014 IEEE $10^{th}$ World Congress on Services, pp. 362-369.

R. Kumar, S. Vassilvitskii, "Generalized distances between Rankings," Yahoo! Research.

J. Rumburg, E. Zbikowski, "The Seven Most Important Performance Indicators for the Service Desk," MetricNet, LLC.

D. Sengupta, U. Maulik, S. Bandyopadhyay, "Entropy Steered Kendall's Tau Measure for a Fair Rank Aggregation".

* cited by examiner

|     | CLIENT PRIORITY | KPI VALUE | KPI RANK | ALARM SEVERITY |
|-----|-----------------|-----------|----------|----------------|
| R1  | HIGH            | WORSENS   | WORSENS  | URGENT         |
|     | HIGH            | WORSENS   | EQUAL    | URGENT         |
|     | HIGH            | WORSENS   | BETTER   | URGENT         |
|     | HIGH            | IMPROVES  | WORSENS  | URGENT         |
|     | HIGH            | IMPROVES  | BETTER   | X              |
|     | HIGH            | IMPROVES  | EQUAL    | MODERATE       |
|     | HIGH            | EQUAL     | WORSENS  | URGENT         |
|     | HIGH            | EQUAL     | BETTER   | LOW            |
|     | HIGH            | EQUAL     | EQUAL    | MODERATE       |
|     | MEDIUM          | WORSENS   | WORSENS  | URGENT         |
|     | MEDIUM          | WORSENS   | EQUAL    | MODERATE       |
|     | MEDIUM          | WORSENS   | BETTER   | MODERATE       |
|     | MEDIUM          | IMPROVES  | WORSENS  | URGENT         |
|     | MEDIUM          | IMPROVES  | BETTER   | X              |
|     | MEDIUM          | IMPROVES  | EQUAL    | X              |
|     | MEDIUM          | EQUAL     | WORSENS  | URGENT         |
|     | MEDIUM          | EQUAL     | BETTER   | LOW            |
|     | MEDIUM          | EQUAL     | EQUAL    | LOW            |
|     | LOW             | WORSENS   | WORSENS  | URGENT         |
|     | LOW             | WORSENS   | EQUAL    | MODERATE       |
|     | LOW             | WORSENS   | BETTER   | MODERATE       |
|     | LOW             | IMPROVES  | WORSENS  | LOW            |
|     | LOW             | IMPROVES  | BETTER   | X              |
|     | LOW             | IMPROVES  | EQUAL    | X              |
|     | LOW             | EQUAL     | WORSENS  | LOW            |
|     | LOW             | EQUAL     | BETTER   | X              |
|     | LOW             | EQUAL     | EQUAL    | X              |

FIG. 8

| CLIENT | PRODUCTIVITY | COST | TAT | UTILIZATION |
|---|---|---|---|---|
| C2 | MODERATE | URGENT | X | URGENT |
| C3 | MODERATE | LOW | X | MODERATE |
| C6 | MODERATE | X | LOW | LOW |
| C7 | URGENT | X | X | LOW |
| C9 | LOW | X | X | LOW |
| C10 | MODERATE | X | LOW | LOW |
| C15 | MODERATE | MODERATE | LOW | X |
| C17 | LOW | MODERATE | LOW | X |

| CLIENT | PRIORITY | PRODUCTIVITY | COST | TAT | UTILIZATION |
|---|---|---|---|---|---|
| C2 | LOW | MODERATE | URGENT | X | URGENT |
| C3 | LOW | MODERATE | LOW | X | MODERATE |
| C6 | LOW | MODERATE | X | LOW | LOW |
| C7 | HIGH | URGENT | X | MODERATE | SEVERE |
| C9 | HIGH | URGENT | X | X | SEVERE |
| C10 | LOW | MODERATE | X | LOW | LOW |
| C15 | MEDIUM | MODERATE | MODERATE | URGENT | X |
| C17 | HIGH | SEVERE | SEVERE | SEVERE | MODERATE |

METHODS AND SYSTEMS FOR ANALYZING AGGREGATE OPERATIONAL EFFICIENCY OF BUSINESS SERVICES

TECHNICAL FIELD

The disclosed subject matter generally relates to performance measurement. More particularly, the disclosed subject matter relates to methods and systems for measuring operational efficiency of business services rendered to a client.

BACKGROUND

Due to ever-increasing competition to efficiently serve the clients, businesses use various methods to determine weaknesses or improvement areas in their service offerings. In order to quantify the quality of services rendered, generally clients are explicitly asked for their feedback using online surveys or feedback forms. These approaches are prone to individual bias and also suffer from reliability issues. For example, even when a client is served well by a given business, a relative sense of judgment may lead to a poor rating. To overcome this, businesses also resort to monitoring efficiency of internal operations that are used for service delivery. The internal operations are measured using a plurality of Key Performance Indicators (KPIs). Examples of KPIs include, but are not limited to, productivity or utilization of employees, average Turn-Around-Time (TAT) of a service, cost of operation, quality of service being delivered and others. The KPIs are measured by evaluating the performance of each employee and/or even the performance of the overall processes. For example, the productivity or utilization is measured by assessing an Enterprise Resource Planning (ERP) based time sheet entries or internal trackers, while cost of operation might be a result of project value and cost incurred per employee (such as salary or other compensation). Because KPIs are designed, monitored and controlled by the service business itself, they are less susceptible to biases. Such KPIs help understand efficiency of business processes in serving a client and have a direct effect on client satisfaction, thereby leading to increased chances of client retention.

A business can analyze the internal operations for a set of clients by comparing the performance for a common KPI. For example, a cost of operation of a client can be directly compared with the cost of operation of another client. Though, more often than not, there is a need to understand the overall health of a given client relative to other clients across a disparate set of KPIs such as, productivity, cost, TAT, utilization, and the like. Typically, each KPI has a different dimension. For example, a cost of operation is measured in currency (such as dollars, pounds, and the like), while TAT is measured as a unit of time (minutes, hours, days, and the like). Similarly, productivity or utilization are measured in form of discrete values or percentages. Because of the disparate dimensions, a client cannot be assigned a direct rank with respect to other clients. Further, if the KPIs have weights, the businesses calculate the performance rank for a client by a simple weighted average scheme which is not an accurate performance indicator for the client.

Therefore, there is a need for a technique to analyze the operational efficiency of a service rendered to a client with respect to other clients based on disparate KPIs.

SUMMARY

The present disclosure provides a computer-implemented method for generating operational alarms for a plurality of clients, the operational alarms being generated by a business performance system, each client being associated with a plurality of Key Performance Indicators (KPIs), wherein value of each KPI indicates the quality of service rendered to each client. A rank for each KPI for each of the plurality of clients is generated by a business process management server. An aggregate rank for each client based on the ranks of each KPI is generated using the business performance system. For each client: the aggregate rank of the client is monitored over one or more time periods by the business performance system. If the aggregate rank deteriorates over the one or more time periods, a severity indicator based on change of value of each KPI and change of rank of each KPI for the client over the one or more time periods is determined, by the business performance system. An operational alarm based on value of the severity indicator is generated, by the business performance system. Finally, the operational alarm on a user interface is displayed, the operational alarm displays one or more KPIs with highest severity values.

The present disclosure discloses a system for generating operational alarms for a plurality of clients, each client being associated with a plurality of Key Performance Indicators (KPIs), wherein value of each KPI indicates the quality of service rendered to each client. The system includes a rank aggregator and a KPI importance classifier. The rank aggregator is configured to: receive a rank for each KPI for each of the plurality of clients; and generate an aggregate rank for each client based on the ranks of each KPI. For each client, the KPI importance classifier is configured to: track the aggregate rank of the client over one or more time periods; if the aggregate rank deteriorates over the one or more time periods, determine a severity indicator based on change of value of each KPI and the change of rank of each KPI for the client over the one or more time periods; generate an operational alarm based on value of the severity indicator; and display the operational alarm on a user interface, wherein the operational alarm displays one or more KPIs with highest severity values.

The disclosure further discloses a system for evaluating business service performance rendered to a plurality of clients, the performance being evaluated based on a plurality of Key Performance Indicators (KPIs), wherein value of each KPI indicates the quality of service rendered to each client. The system includes an aggregation component, a KPI importance classifier and a display unit. The aggregation component is configured to: generate an aggregate rank for each client based on ranks of each KPI, the aggregate rank being generated using a Kemeny rank aggregation method, wherein the Kemeny rank aggregation method additionally uses a priority value assigned to each client while generating the aggregated rank. For each client, the KPI importance classifier is configured to: monitor the aggregate rank of the client over one or more time periods; if the aggregate rank deteriorates over the one or more time periods, determine a severity indicator based on change of value of each KPI and the change of rank of each KPI for the client over the one or more time periods; and generate an operational alarm based on value of the severity indicator. The display unit is configured to display the operational alarm on a user interface, wherein the operational alarm displays one or more KPIs with highest severity values.

Furthermore, the disclosure discloses a business performance system for enhancing quality of service rendered to a plurality of clients, each client being associated with a plurality of Key Performance Indicators (KPIs), wherein value of each KPI indicates the quality of service rendered to each client. The business performance system comprising an aggregation component and a KPI importance classifier. The aggregation component is configured to generate an aggregate rank for each client based on ranks of each KPI, the aggregate rank being generated using a Kemeny rank aggregation method. The KPI importance classifier is configured to compare the aggregate rank of each client with their respective historical aggregate ranks stored in a database. The KPI importance classifier includes a rank comparator, a value comparator, an alarm generator, and a transmitter. The rank comparator is configured to compare the individual KPI ranks for each client over a plurality of time windows based on a negative slip in the aggregate rank. The value comparator is configured to determine one or more possibilities between the status of each KPI rank and each KPI value, and to identify a severity indicator for each KPI. The alarm generator is configured to generate an alarm based on the severity indicators. The transmitter is configured to electronically communicate the generated alarm to one or more personnel for taking one or more actions.

Other and further aspects and features of the disclosure will be evident from reading the following detailed description of the embodiments, which are intended to illustrate, not limit, the present disclosure.

BRIEF DESCRIPTION OF THE DRAWINGS

The illustrated embodiments of the subject matter will be best understood by reference to the drawings, wherein like parts are designated by like numerals throughout. The following description is intended only by way of example, and simply illustrates certain selected embodiments of devices, systems, and processes that are consistent with the subject matter as claimed herein.

FIG. 8 illustrates an exemplary alarm generator table.

DETAILED DESCRIPTION

Figure 1:
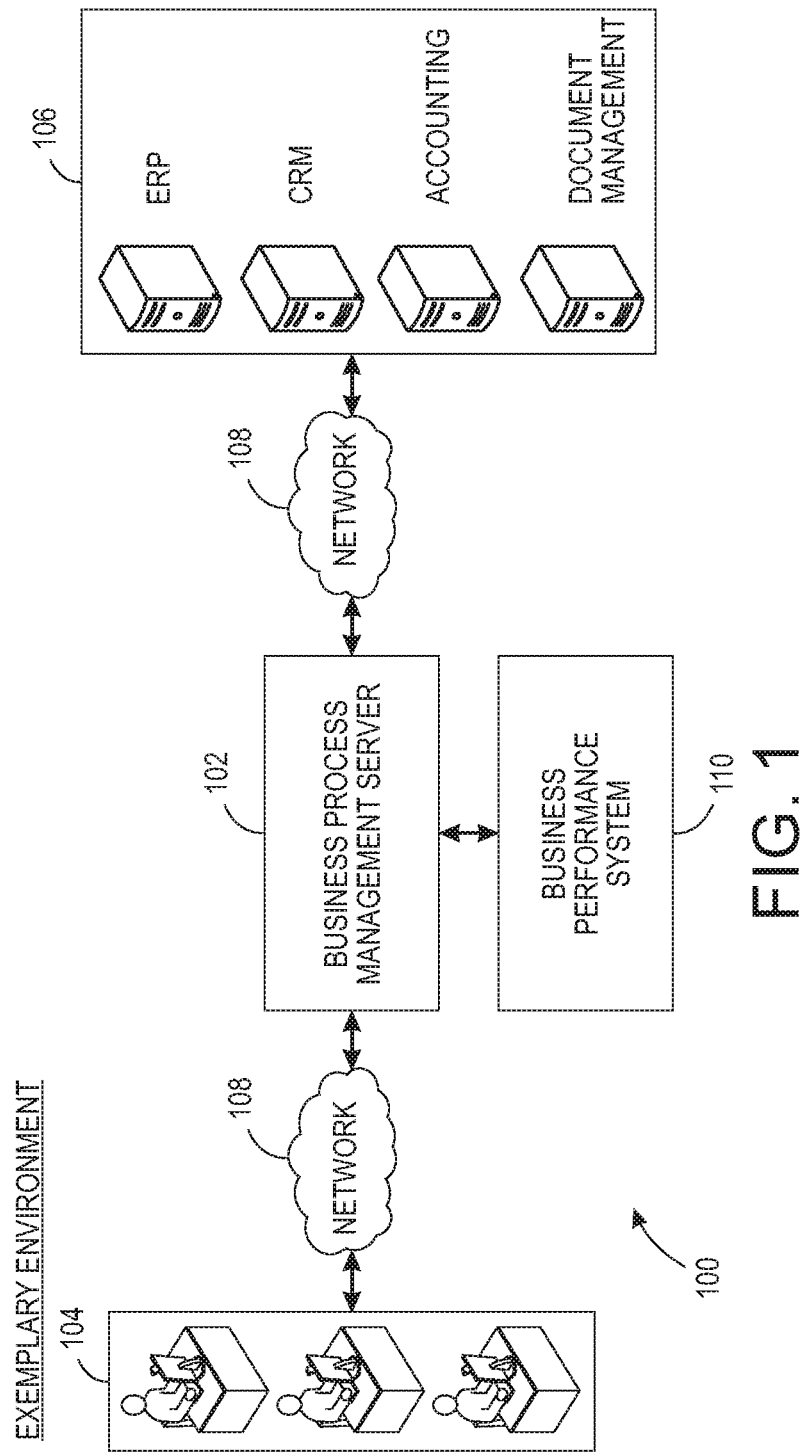
FIG. 1 illustrates an exemplary environment in which various embodiments of the disclosure can be practiced.

A few inventive aspects of the disclosed embodiments are explained in detail below with reference to the various figures. Embodiments are described to illustrate the disclosed subject matter, not to limit its scope, which is defined by the claims. Those of ordinary skill in the art will recognize a number of equivalent variations of the various features provided in the description that follows.

Non-Limiting Definitions

Definitions of one or more terms that will be used in this disclosure are described below without limitations. For a person skilled in the art, it is understood that the definitions are provided just for the sake of clarity, and are intended to include more examples than just provided below.

The term "business" relates to any agency, company, organization, or a firm that provisions services or goods to clients or consumers. Further, the term "client" relates to any agency, company, a firm, or an individual to whom services or goods are rendered. In context of the disclosure, the "rank" of a client refers to the rank of the services rendered to the client. In other words, if a client $C_1$ is assigned a rank $\rho_1$, it signifies that the service rendered to the client has a rank $\rho_1$.

An "operational efficiency" refers to the capability of a business to render cost-effective and high quality services to the clients.

The term "Key Performance Indicator" (KPI) is a metric used to evaluate/quantify a factor representing operational efficiency of services provisioned to the clients. The value of each KPI determines how well the clients are served. Examples of KPIs include, but are not limited to, a cost of operation, a utilization of employees, turn-around-time of transaction, and the like. The KPIs can be represented in multiple dimensions, such as, percentage, cost, time, levels, and the like.

An "indicator" is any means that indicates value or level of a parameter and can include, numeric values or levels such as high, medium, low, urgent, moderate, severe, and the like. One such parameter is severity and the corresponding indicator is severity indicator. The term "operational alarms" include any alerts, notifications or any means, to indicate KPIs responsible for severity or KPI's ranks over time.

As used herein, a "business process management server" is a conventional device/system equipped with a plurality of software/hardware components for analyzing the operational efficiency of the business services being provided to the clients. The efficiency is analysed by computing values of a plurality of KPIs for each client, assigning a rank to each KPI for each client.

The present disclosure introduces "a business performance system" for improving/enhancing operational efficiency of business services. The business performance system performs rank aggregation and monitors KPIs over multiple time windows. The system refers to any device, combination of modules/components or others.

A "historical database" is a storage device that stores the client-related information and the values used for measuring the operational efficiency, i.e., the KPIs. The historical database also stores the ranks for each KPI and the aggregate rank of each client across multiple time periods. The historical database may simply be referred to as a database.

Overview

The present disclosure provides a technique to analyze the operational efficiency of the business services rendered to a plurality of clients. Specifically, the present disclosure discloses methods and systems for evaluating the services rendered to a plurality of clients using disparate KPIs. Examples of disparate KPIs include, but are not limited to, a cost of operation, a utilization of employees, a turn-around-time of a transaction, a productivity of an employee, and the like. Each client is first assigned a rank for each KPI, and is then assigned an aggregate rank across all ranked KPIs across all clients. The aggregate rank for each client is monitored across one or more time windows, and if a deterioration in the aggregate rank is detected, an operational alarm is generated. The alarm indicates the one or more KPIs directly responsible for the aggregate rank deterioration. The one or more KPIs can then be analyzed to determine how to improve the future operational efficiency for such clients.

Exemplary Environment

FIG. 1 illustrates an exemplary environment/system 100 in which various embodiments of the disclosure can be practiced. Particularly, FIG. 1 discloses the overall system 100 configured for analyzing client related operational efficiency of a business, according to an aspect of the disclosure. The system 100 corresponds to a business infrastructure that includes a business process management server 102, a plurality of business teams 104, a plurality of back-end systems 106 and a business performance system 110. In an exemplary embodiment of the disclosure, a business refers to a service business, such as Business Process Outsourcing (BPO), Information Technology (IT) service, and the like.

The business process management server 102 is configured to administer a plurality of business processes. Examples include, but are not limited to, workflow management, event monitoring, employee performance monitoring, and the like. The business process management server 102 pools data from the back-end systems 106 and analyses the data using one or more business rules. For example, Enterprise Resource Planning (ERP) is one of the back-end systems 106 that stores data corresponding to employees, inventory, manufacturing, shipping, and the like. The business process management server 102 accesses the data from the ERP systems to calculate information such as employee productivity, inventory replenishment, and the like. The calculated information is then displayed over a dashboard or user interface of a similar analytics software (not shown), and can be accessed by the business teams 104. The business teams 104 include customer service agents, executive management, accountants, invoice team, analysts, and the like. Other components of the back-end systems 106 include, but are not limited to, a Customer Relational Management (CRM) system, an accounting system, a document management system, and the like.

The business process management server 102, the business teams 104, and the back-end systems 106 are connected over a network 108. The network 108 may include, for example, one or more of the Internet, Wide Area Networks (WANs), Local Area Networks (LANs), analog or digital wired and wireless telephone Networks (e.g., a PSTN, Integrated Services Digital Network (ISDN), a cellular network, and Digital Subscriber Line (xDSL), Wi-Fi, radio, television, cable, satellite, and/or any other delivery or tunneling mechanism for carrying data. The network 108 may include multiple networks or sub-networks, each of which may include, for example, a wired or wireless data pathway. The network 108 may include a circuit-switched voice network, a packet-switched data network, or any other network able to carry electronic communications. For example, the network 108 may include networks based on the Internet protocol (IP) or asynchronous transfer mode (ATM), and may support voice using, for example, VoIP, Voice-over-ATM, or other comparable protocols used for voice, video, and data communications.

The business process management server 102 is configured to analyse client related operational efficiency. In other words, business process management server 102 calculates quantitative parameters for internal operations that are used to serve a client. The quantitative parameters correspond to Key Performance Indicators (KPIs). For each client, there are disparate KPIs that together denote the performance efficiency for serving the client. Examples of KPIs include, but are not limited to, productivity of employees, Turn-Around-Time (TAT), cost of operation, utilization of employees or resources, and the like. Each KPI has a separate dimension or unit of measurement. For example, cost of operation is measured in currency, while TAT is in a time-based unit (such as minutes, hours, days, and the like). The specifics of the KPIs will be discussed with respect to FIG. 2.

In the context of the present disclosure, the business performance system 110 analyses and helps improve operational efficiency of the business/organization. To this end, the business performance system 110 focuses on rank aggregation and rank monitoring and this will be discussed in detail below. Particularly, the business performance system 110 assigns an aggregate rank to each client based on the ranks of each KPI across all clients. The business performance system 110 further monitors the change in the aggregate rank of each client over multiple time windows, and if a deterioration is detected, it generates and displays an operational alarm. The generation of alarm takes into account the contribution of the value of each KPI and the rank of each KPI, such that the KPIs that caused the rank deterioration can be accurately identified.

The business performance system 110 may be integrated with the conventional business process management server 102. In other embodiments, the business performance system 110 may be a separate entity and communicates with the business process management server 102 using communication protocols as known in the art or developed later.

Disparate KPIs

Figure 2:
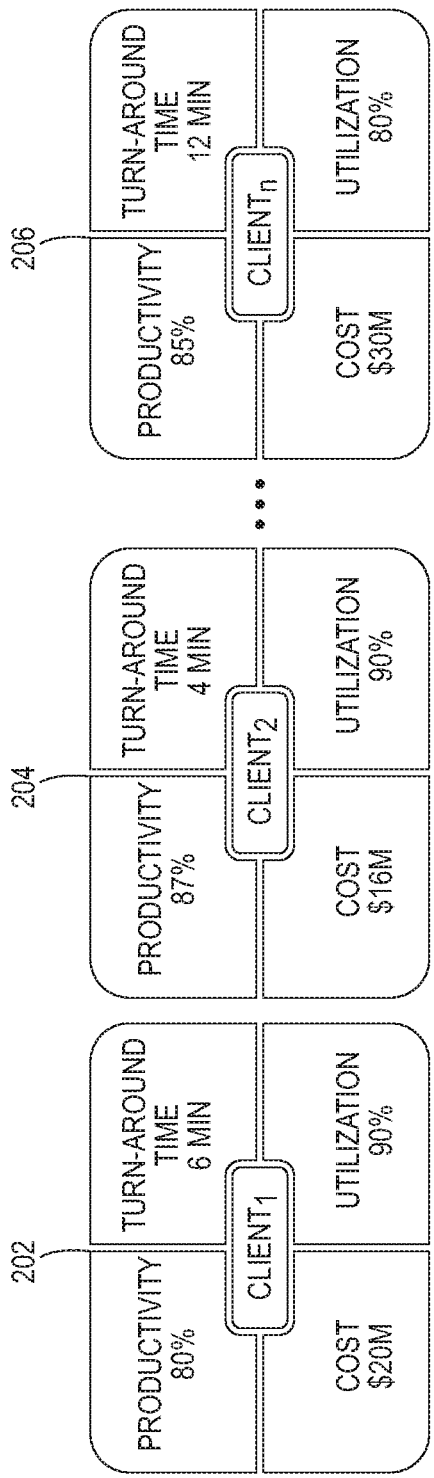
FIG. 2 is a block diagram illustrating disparate KPIs of multiple clients of a service business.

FIG. 2 is a block diagram illustrating disparate KPIs of multiple clients of a service business. The clients are represented as a client 202, a client 204, and a client 206. In an embodiment, for each client, there are four distinct KPIs:

Productivity: It refers to the productivity of employees who provide the service to a client. In other words, it signifies the overall output of the employees in a specific time period. In an embodiment, productivity is indicated in terms of a percentage value. For example, for the client 202, the productivity KPI is 80%.

TAT: It refers to the overall time taken to complete the service for a client. TAT is indicated as a measure of time, such as minutes. For example, for the client 204, the TAT KPI is 4 minutes.

Cost: It refers to the cost of operation for serving a client, and is indicated as a currency value. For example, for the client 206, the cost KPI is $30 m.

Utilization: It refers to the percentage of employees of the total employees that served a client. For example, for the client 202, the utilization KPI is 90%.

The operational efficiency for the client 202, the client 204, and the client 206 may be compared for a common KPI. For example, in terms of the productivity KPI, the client 204 is better served (with 87% of productivity). However, the cost KPI of the client 202 (with $20 M value) is better than the client 204 and the client 206. The present disclosure discusses techniques to compare the operational efficiency of clients across disparate KPIs, and not just a common KPI. This is achieved by assigning an aggregate rank to each client service as well as monitoring of the aggregate ranks over different time windows. These will be discussed with reference to subsequent figures.

Overall System

Figure 3:
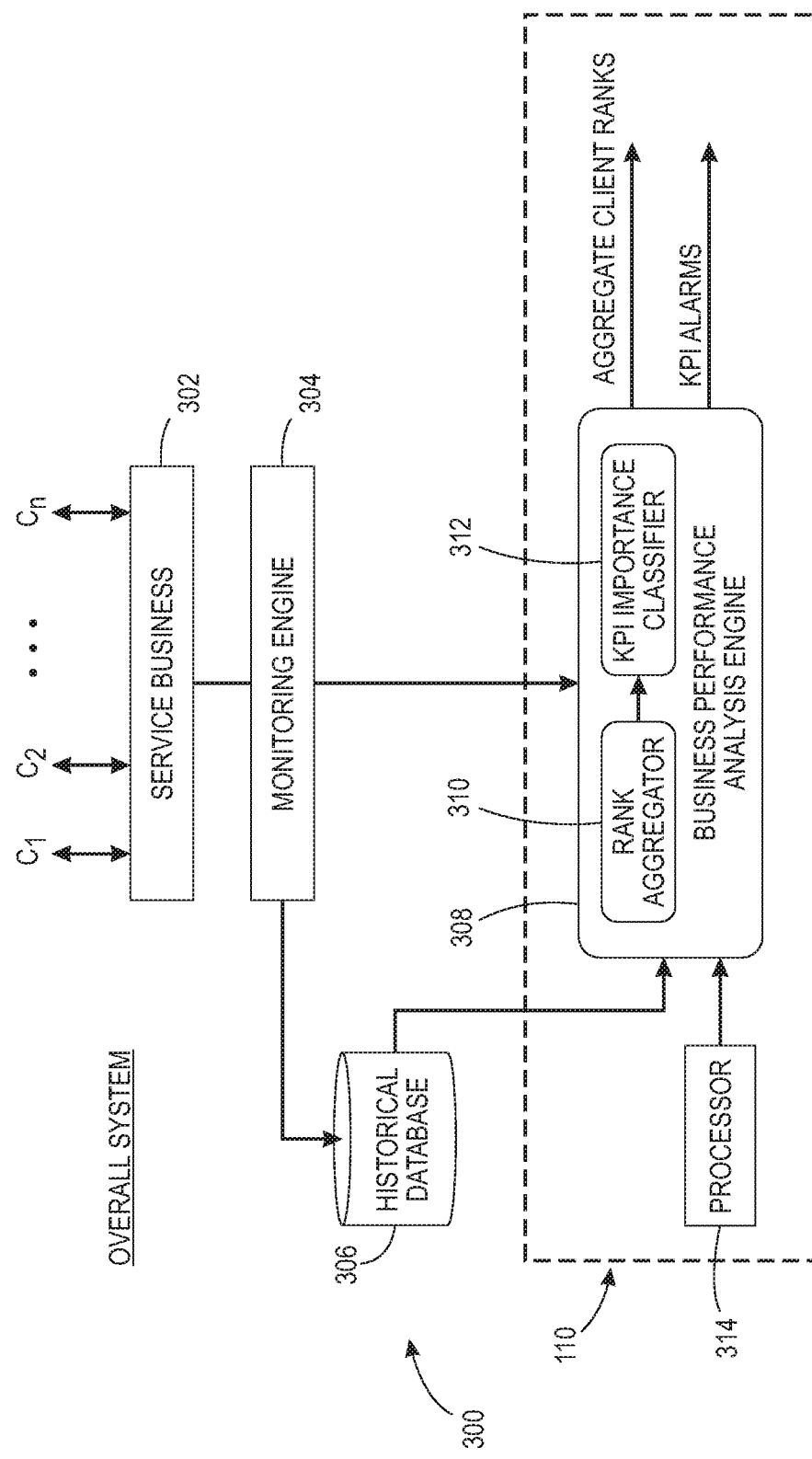
FIG. 3 illustrates an overall system including a business performance system for analyzing operations of a service business, according to an embodiment of the disclosure.

FIG. 3 illustrates the overall system including the business performance system 110 for analyzing operations of a service business 302 according to an embodiment of the disclosure. The business performance system 110 can be integrated in a service business (e.g., BPO) ecosystem 300. BPO ecosystem is just one example, the business performance system 110 may be integrated with any type of service business. Typically, a service business ecosystem 300 includes a plurality of clients $C_1, C_2, \ldots C_n$ which are served by the service business 302. The service business ecosystem 300 includes a monitoring engine 304 that is configured to monitor client records generated over a period of time and store the client records in a historical database 306. Examples of client records include, but are not limited to, individual client records, KPIs, KPI priorities, and the like. The historical database 306 may be either locally available to the business performance system 110, or it can be hosted remotely and accessed over a network. In an embodiment of the disclosure, one or more combination of the monitoring engine 304, the historical database 306, and the business performance system 110 are part of the business process management server 102.

In an embodiment, the business performance system 110 includes a business performance analysis engine 308 which is configured to receive client records from the historical database 306. The business performance analysis engine 308 may also receive live client records generated by the monitoring engine 304.

In the context of the present disclosure, the business performance analysis engine 308 includes a rank aggregator 310 and a KPI importance classifier 312. The rank aggregator 310 is configured to generate an aggregate rank of a client service using disparate KPIs, as will be discussed below. The KPI importance classifier 312 is configured to analyze current aggregate rank for a client service with respect to a historical aggregate rank of the client service, and identifies if there is any change in the rank. In case of rank deterioration, the KPI importance classifier 312 identifies the one or more KPIs that resulted in the deterioration or increase. In case of rank deterioration, the KPI importance classifier 312 triggers one or more KPI alarms. The business performance system 110 also includes a processor 314 that is configured to execute the processing instructions of the business performance analysis engine 308. Further, the rank aggregator 310 and the KPI importance classifier 312 and any sub-components therein may be software modules, hardware modules or a combination thereof and will be discussed in detail below.

Rank Aggregator

Figure 4:
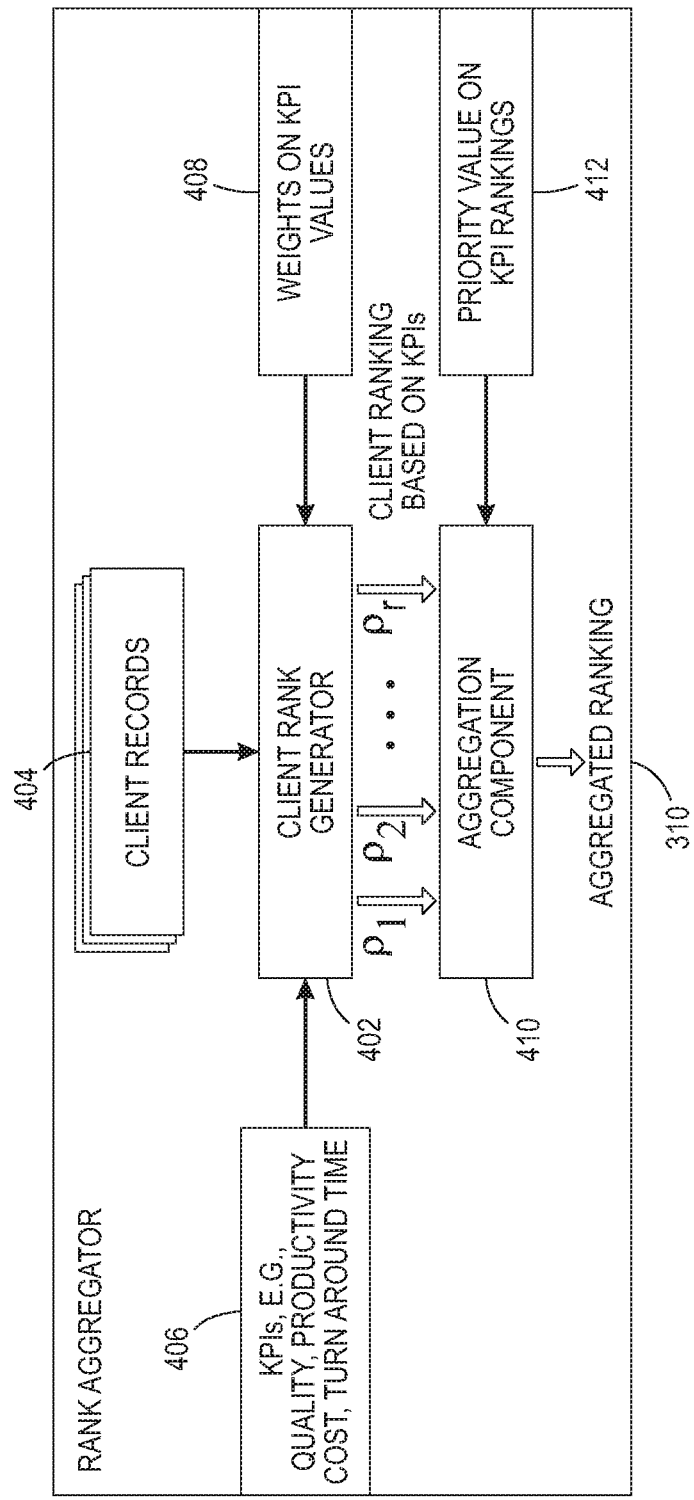
FIG. 4 illustrates a block diagram of a rank aggregator, according to an embodiment of the disclosure.

FIG. 4 illustrates a block diagram of the rank aggregator 310 according to an embodiment of the disclosure. The rank aggregator 310 includes a client rank generator 402 that is configured to receive a plurality of inputs from at least one of the historical database 306 and the monitoring engine 304. The plurality of inputs include client records 404, KPI values 406, and weights 408 on KPI values. If a set of clients is indicated as $C_1, C_2 \ldots C_n$, the client records 404 are represented as $R_1, R_2 \ldots R_n$, where each record $R_i$ corresponds to a client $C_i$, for i=1, 2, ... n. The KPI values 406 are represented as $K_1, K_2 \ldots K_r$. Each record $R_i$ represents a tuple $<K_1^{(i)}, K_2^{(i)} \ldots K_r^{(i)}>$ containing the values for each client $C_i$. For example, the value for KPI TAT for a client $C_1$ may be 5 minutes, and for a client $C_2$, this value may be 10 minutes. Further, for each client $C_i$, each KPI may have a weights 408 on its value. The weights 408 are represented as $\alpha_1^{(i)}, \alpha_2^{(i)} \ldots \alpha_r^{(i)}$. Without assignment of weights, the KPI values indicate that the service for client $C_1$ is better than the service for client $C_2$. However, for client $C_1$, 5 minutes may be considered a slow TAT, while for client $C_2$ 10 minutes may be faster than expected. To take this expected level of service across the set of clients into consideration, weights 408 can be assigned to the KPIs.

Using the plurality of inputs, the client rank generator 402 generates individual KPI based ranks for the clients. Individual KPI ranks are represented as $\rho_1, \rho_2, \ldots \rho_r$, where $\rho_i$ corresponds to the ranking of the clients based on the KPI $K_i$ for i=1, 2, ..., r. In one embodiment, individual KPI ranks are generated by a sorted ordering of the client set based on each KPI. For example, the client rank generator 402 sorts the clients based on the values of the KPI productivity in descending order. In other words, a client for which the productivity is high may come earlier in the ranking compared to a client with lower productivity value. As another example, the clients are sorted in ascending order of the KPI cost of operation. In another embodiment, when the KPI values are assigned a weight, the KPI values are multiplied by the weights, and then ranks are assigned. The output of the client rank generator 402 includes rank lists $\rho_1, \rho_2, \ldots \rho_r$ for each KPI $K_1, K_2, \ldots, K_r$.

Still referring to FIG. 4, the rank aggregator 310 also includes an aggregation component 410. The aggregation component 410 is configured to receive the rank lists $\rho_1, \rho_2, \ldots \rho_r$ from the client rank generator 402 and generate an aggregate KPI rank $\rho_A$ of the clients across all KPIs. The aggregate KPI rank $\rho_A$ signifies the overall quality of service rendered to each client. For example, if a client $C_1$ has a higher rank $\rho_i$ in KPI $K_1$, and a lower rank $\rho_j$ in KPI $K_2$, an aggregate rank is assigned to the client $C_1$ by taking into account ranks across all KPIs. In one embodiment, the aggregation component 410 considers KPI priority values 412 to generate the aggregate KPI rank for each client. The KPI priority values 412 are represented as $W_1^{(i)}, W_2^{(i)} \ldots W_r^{(i)}$. The KPI priorities denote the relative priority between the KPIs of a client $C_i$. For example, for client $C_1$, the TAT may have a higher priority than cost of operation.

Aggregation Flowchart

Figure 5:
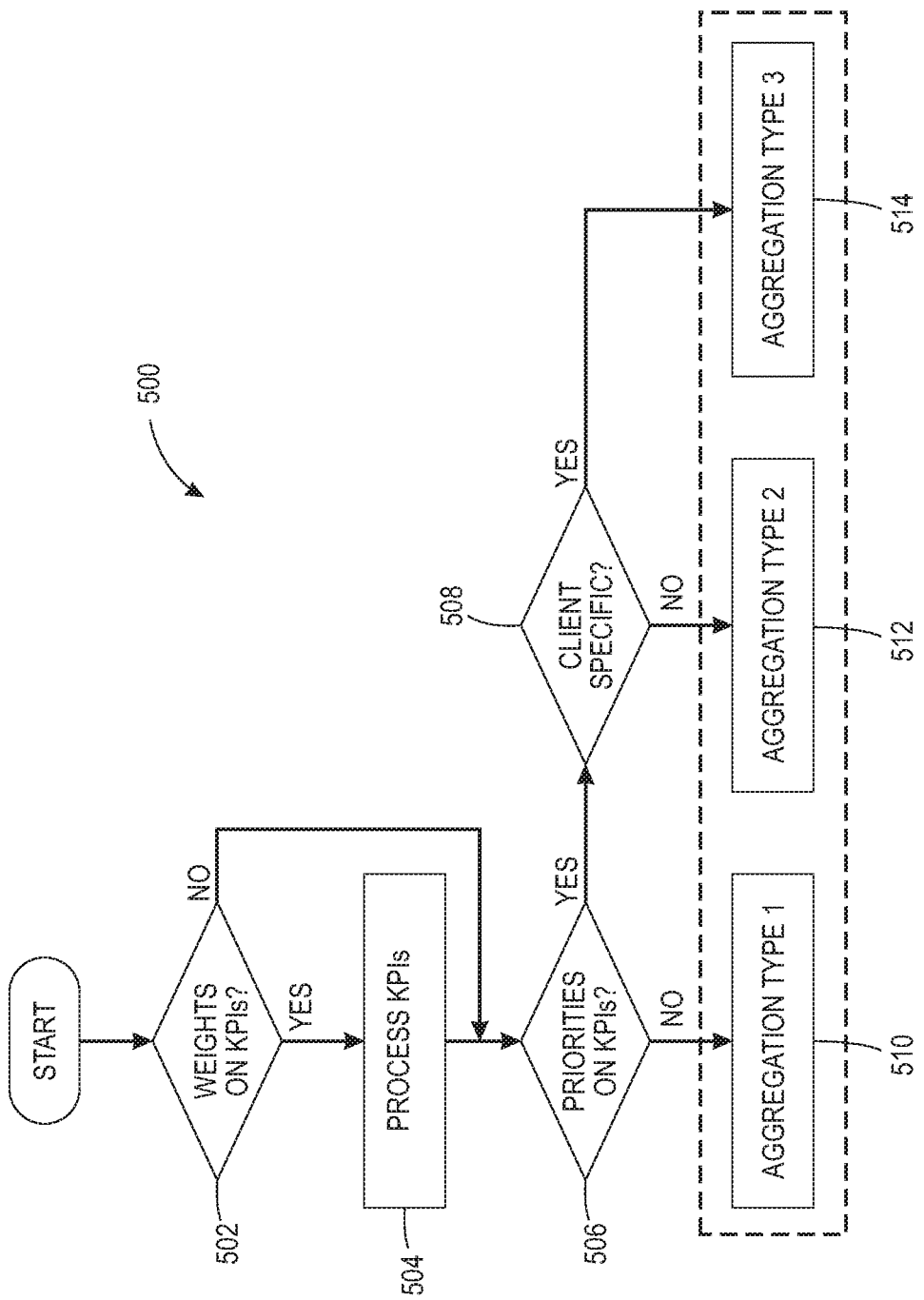
FIG. 5 illustrates a process of generating an aggregate KPI rank for each client, according to an embodiment of the disclosure.

Referring to FIG. 5, the process 500 of generating an aggregate KPI rank for each client is explained. This process 500 is performed by the rank aggregator 310. At 502, the rank aggregator 310 determines whether there is any weight on each KPI. If there is a weight on the KPIs, the rank aggregator 310, at 504 processes these KPIs according to their weights by multiplying the weights with the value of KPIs. However, if the KPIs have no weights, at 506 the rank aggregator 310 determines if there is any priority on the KPIs. If there is no priority on the KPIs, an aggregate KPI rank is generated according to Aggregation Type 1 (explained below) at 510. However, if there is a priority on the KPIs, at 508, the rank aggregator 310 determines if there are any client specific requirements associated with the priority. If there is a client specific priority, the aggregate KPI rank is generated according to Aggregation Type 2 (explained below) at 512, otherwise it is generated according to Aggregation Type 3 (explained below) at 514.

In one embodiment, the aggregated ranks are generated using a Kemeny Rank Aggregation method. The Kemeny Rank Aggregation method minimizes the number of pairwise disagreements between client pairs and between the individual KPI rank lists. If a client $C_i$ is ranked before a client $C_j$ in most of the individual KPI rank lists, the aggregate rank list takes into account the rank difference. For example, there are two clients $C_1$ and $C_2$ in the client set. A binary variable $X_{C_1C_2}$ is defined as:

$$X_{C_1C_2} = \begin{cases} 1, & \text{If the aggregate ranks } C1 \text{ ahead of } C2 \\ 0, & \text{Otherise} \end{cases}$$

Another variable $\eta_{C_1C_2}$ is considered which denotes the number of individual KPI rank lists that rank for client $C_1$ ahead of client $C_2$ and $\eta_{C_2C_1}$ denotes that rank for $C_2$ is ahead of $C_1$. Such variables are defined for each client pair. The objective of the Kemeny rank aggregation method is to minimize the number of disagreements with the individual rankings. This is expressed by the following Integer Linear Program (ILP) optimization formulation:

$$\text{Minimize} \sum_{C_1 \neq C_2} n_{C_1C_2} X_{C_2C_1}$$

such that, $$(\forall C_1, C_2 : C_1 \neq C_2), X_{C_1C_2} + X_{C_2C_1} = 1 \quad (1)$$

$$(\forall C_1, C_2, C_3 : C_2, C_1 \neq C_3, C_2 \neq C_3), X_{C_1C_2} + X_{C_2C_3} + X_{C_3C_1} \leq 2 \quad (2)$$

$$(\forall C_1, C_2 : C_1 \neq C_2), X_{C_1C_2} \in \{0,1\} \quad (3)$$

Constraint 1 expresses for any client pair, $C_i$, $C_j$, one of them is ranked ahead of the other, thus both the binary variables cannot be 0 or 1. Constraint 2 is the transitivity constraint between client triplets. Unless this constraint is in place, the aggregate ranking may assign values to the binary variables with a cyclic majority: $C_i$ ahead of $C_j$, $C_j$ ahead of $C_k$, and $C_k$ ahead of $C_i$. Constraint 3 expresses that the $X_{C_iC_j}$ variables are binary. The output of the optimization is a value (0/1) for each binary variable $X_{C_iC_j}$ that leads to the minimum value of the objective, subject to the constraints.

Aggregation Type 1: KPIs without Priority Values on Rankings

At 510 of FIG. 5, if there is no priority on the KPIs, an aggregate KPI rank is generated according to Aggregation Type 1. In Aggregation Type 1, the Kemeny rank aggregation method described above is used to generate the aggregate KPI rank for each client.

Aggregation Type 2: KPIs with Priority Values on Rankings

At 512, Aggregation Type 2 is used to generate an aggregate KPI ranking if KPIs have priorities. In this case, each KPI has a relative normalized priority value associated with each KPI rank list. To compute the aggregate ranking, the Kemeny method is modified to incorporate the priority on each KPI ranking. For example, for client $C_1$, the TAT may have a higher priority than cost of operation. The definition of $n_{C_1C_2}$ is modified as follows. The original definition is the pairwise count of the number of lists expressing the pairwise majority. In this case, to take care of the priority values, the value of $n_{C_1C_2}$ is redefined as the priority induced sum of the KPI values for which $C_1$ comes earlier than $C_2$ in the ranking based on those KPIs. To formalize, an indicator variable is defined as below:

$$I^{(p)}_{C_iC_j} = \begin{cases} 1, & \text{if } C_i \text{ ahead of } C_j \text{ in } KPI\ p \\ 0, & \text{otherwise} \end{cases} \quad (4)$$

Then, the variable is $n_{C_iC_j}^{(p)}$ defined as:

$$n_{C_iC_j}^{(p)} = \sum_{p=1}^{r} W_p I^{(p)}_{C_iC_j} \quad (5)$$

where, $W_p$ is the priority on the rank list for KPI $K_p$.

Aggregation Type 3: KPIs with Client Specific Priority Values on Rankings

Aggregation Type 3 is used to generate an aggregate KPI ranking if KPIs have client-specific priorities. For each KPI, the clients have different normalized priority values. In this case, if the number of times $C_1$ is ahead of $C_2$ in the individual KPI based rankings is greater than the number of times $C_2$ is ahead of $C_1$, KPI priority corresponding to $C_1$ is considered in computing the aggregate rank, else the priority that $C_2$ associates to this KPI is considered. Values of $n_{C_1C_2}$ and $n_{C_2C_1}$ are calculated in a manner similar to Aggregation Type 2. Two variables $z_{C_iC_j}$ and $z_{C_jC_i}$ are introduced as:

$z_{C_iC_j}$=Number of times $C_i$ is ahead of $C_j$
$z_{C_jC_i}$=Number of times $C_j$ is ahead of $C_i$ Then, the variable is $n_{C_iC_j}^{(p)}$ defined as:

$$n_{C_iC_j}^{(p)} = \begin{cases} \sum_{p=1}^{r} W_p^{(i)} I^{(p)}_{C_iC_j}, & \text{if } z_{C_iC_j} > z_{C_jC_i} \\ \sum_{p=1}^{r} W_p^{(j)} I^{(p)}_{C_iC_j}, & \text{if } z_{C_jC_i} > z_{C_iC_j} \end{cases} \quad (6)$$

KPI Importance Classifier

Figure 6:
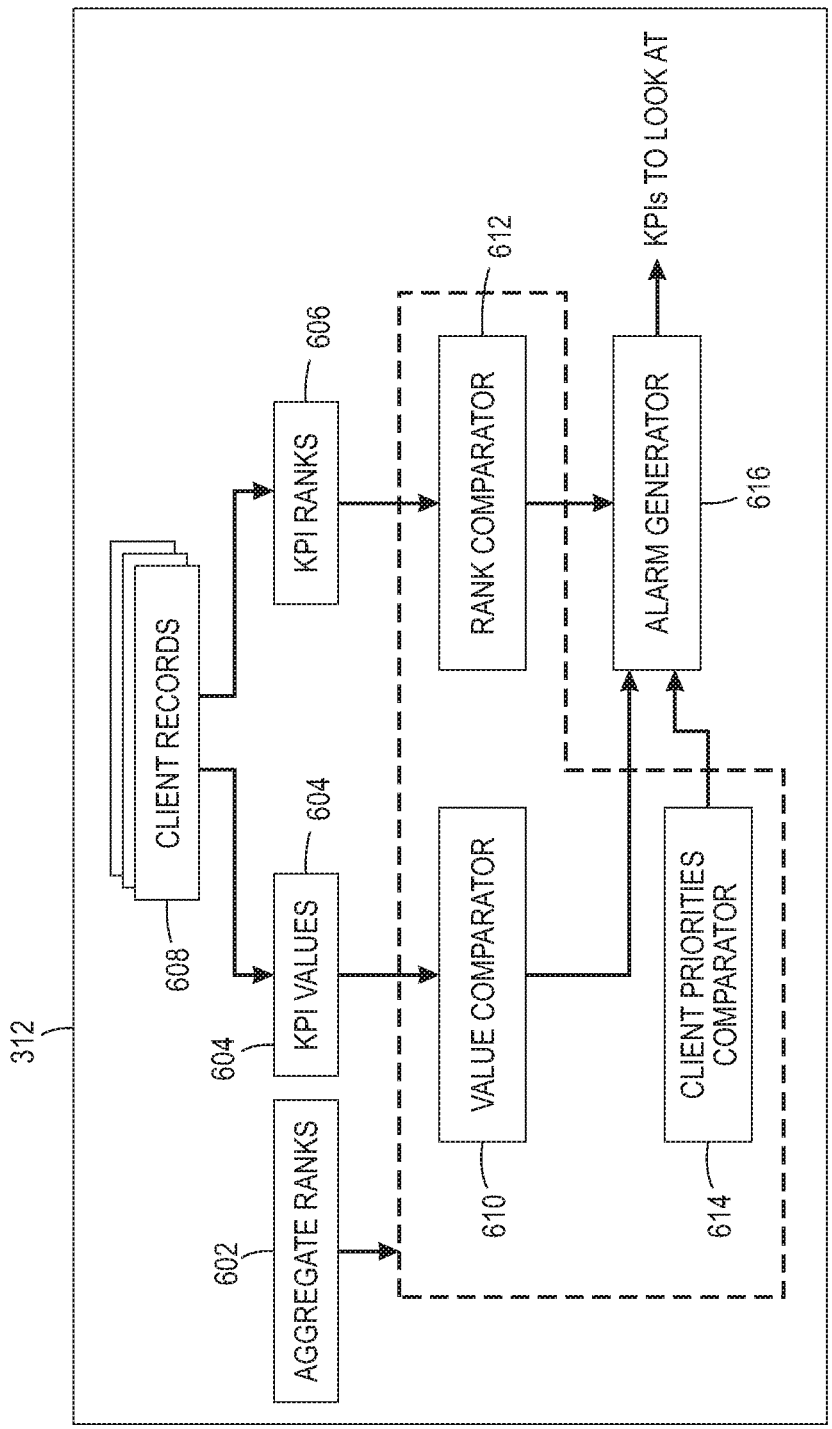
FIG. 6 illustrates a block diagram of a KPI importance classifier, according to an embodiment of the disclosure.

Referring to FIG. 6, the KPI importance classifier 312 and its components are described, according to an embodiment of the disclosure. The KPI importance classifier 312 is configured to receive aggregate ranks 602 from the rank aggregator 310, and compares them with their respective historical aggregate ranks stored in the historical database 306 (FIG. 3). The historical aggregate ranks correspond to aggregate ranks of the clients over several time periods (e.g., months). In another embodiment, the historical aggregate ranks may also include a historical average of ranks taken across several months in the past. Broadly, when the aggregate ranks 602 of clients are compared, three scenarios emerge: a client's aggregate rank is improved, worsened, or has remained same. If the comparison indicates a deterioration in rank for a client across successive time windows, it denotes that the quality of service (i.e., the operational efficiency) rendered to the client needs attention. For such cases, the KPI importance classifier 312 identifies the one or more KPIs that contributed to the rank deterioration. Typically, a negative slip in the aggregate rank value for a client indicates deterioration of the performance of operational processes that are used to serve the client. However, since the aggregate rank for each client is a relative measure, the exact cause of rank deterioration may not be negative slip in one or more KPIs alone. In other words, the aggregate rank of a client $C_1$ is calculated after taking into account each KPI ranks and KPI values (along with weights and priorities) of all other clients, therefore the reason for a deterioration in rank of client $C_1$ needs to be identified on a relative scale and not just the KPI values associated with client $C_1$. In order to identify the effective root cause and diagnose the reason for the change in client rankings, estimating the view and movement of the clients in each of the KPIs and raw KPI values is necessary. Consequently, the ranks of $C_1$ in each individual KPI ranked list are evaluated, along with the raw KPI values. Therefore, the KPI importance classifier 312 also receives KPI values 604 and KPI ranks 606, along with the aggregate ranks 602. The KPI values 604 and KPI ranks 606 are identified from client records 608.

The KPI importance classifier 312 includes a value comparator 610, a rank comparator 612, a client priorities comparator 614, and an alarm generator 616. When a deterioration in the aggregate rank of a client $C_1$ is detected, the value comparator 610 is configured to compare the KPI values 604 of the client $C_1$ with all other clients over a time period. Further, the rank comparator 612 is configured to compare the rank of client $C_1$ in each KPI with all other clients over a time period.

Rank Comparator

When a negative slip in the aggregate rank of a client $C_1$ is detected, the rank comparator 612 compares the individual KPI ranks for the client $C_1$ over a plurality of time windows. The comparison results in one of the following scenarios:

Scenario 1:

For a particular KPI $K_1$, the rank of the client $C_1$ is the same over the time windows. This signifies one of the following:

The rank for some other KPI (other than $K_1$) had deteriorated for the client $C_1$, thereby resulting in deterioration of its aggregated rank.

The rank of other clients for KPI $K_1$ is improved more than that of $C_1$ in the time windows.

Scenario 2:

For the KPI $K_1$, the rank of the client $C_1$ is worsened over the time windows. This signifies one of the following:

The KPI value for $C_1$ is decreased in the time windows.

The KPI value for $C_1$ remained same in the time windows, however the KPI values $K_1$ for other clients improved more than that of $C_1$.

Scenario 3:

For the KPI $K_1$, the rank of the client $C_1$ is improved over the time windows.

Once the rank comparator 612 identifies one of the above scenarios, the raw KPI values 604 are analyzed by the value comparator 610 to diagnose the one or more KPIs responsible for deterioration of the aggregate rank.

Value Comparator

Figure 7:
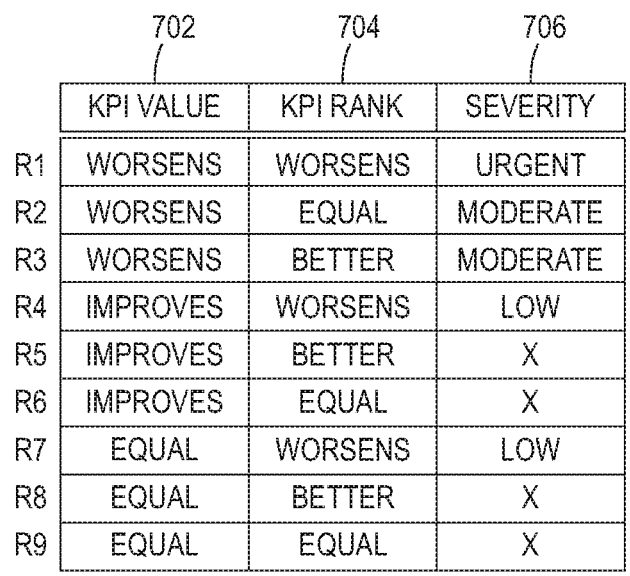
FIG. 7 illustrates an exemplary value comparator table.

The value comparator 610 uses one or more decision logics to determine the different possibilities between the status of the KPI ranks 606 and the KPI values 604, and identifies a severity indicator for each KPI. The decision logic is explained with respect to FIG. 7. A table 700 indicates 9 possibilities after application of the decision logic to a KPI value 702 and a KPI rank 704 of a client $C_1$. A severity indicator 706 is computed based on the comparison between the KPI value 702 and the KPI rank 704. Such a table is created for all clients and each KPI. The severity indicator 706 is fed to the alarm generator 616 (shown in FIG. 6).

In row R1, if both the KPI value 702 and the KPI rank 704 for the client $C_1$ worsened, the severity indicator 706 is assigned as "Urgent." For row R2 and R3, if the KPI value 702 is worsened, however the KPI rank 704 remained the same or had improved, this is considered with a relatively moderate priority. The fact that the client retained its KPI rank can be attributed to the fact that other clients have even more deterioration in their KPI values. Therefore, for $C_1$, worsening in the KPI value 702 is tolerable and is enough to retain its KPI rank 704. However, this may change over time and other clients may showcase more improvement. As a result, the client $C_1$ may slip down in the rank, possibly with more impact on its aggregate rank as well. Therefore, the severity indicator is marked as "Moderate." For the cases where the client $C_1$ is improved/remained equal on its KPI value 702 or KPI rank 704 or both (row R5, row R6, row R8, and row R9), the severity indicator 706 is marked as disregarded (e.g., 'X'). For other cases (row R4 and row R7) where the KPI value 702 remains the same and the KPI rank 704 worsens, the severity can be low but something to note because this may lead to more severe consequences in future if $C_1$ continues to retain similar values and others continue to improve continuously. Therefore, the severity indicator 706 is marked as "Low."

Referring back to FIG. 6, the client priorities comparator 614 is configured to determine alarm indicators for the plurality of clients based on a) client priority indicators and b) the severity indicators of the plurality of clients as determined by the value comparator 610. Once the severity indicators are determined by the value comparator 610, relative severity of the severity indicators are determined based on client priority indicators. A business may have different categories of clients. The importance associated with each client is variable and depends on the size of the client, the revenue earned, duration of association, and the like. This is a key factor for the alarm generation phase. Generating several severity alarms may not be advantageous and can divert the focus away from where it is really needed. Therefore, the client priority indicators are considered along with the severity indicators generated by the value comparator 610 to generate actual alarm indicators that can be acted upon.

A high severity alarm for a relatively less priority client can be produced in a lower order as compared to a high severity alarm for a high priority client. In one embodiment, three levels of client priority indicators, namely, "High," "Medium," and "Low" are used along with the severity indicators. Therefore, corresponding to each KPI, for each client, there are 27 (3×9) possible outcomes and accordingly a decision table is generated as shown in FIG. 8. Referring to FIG. 8, a table 800 includes four columns: a client priority indicator column 802, the KPI value 702, the KPI rank 704, and an alarm indicator column 804. The alarm indicator column 804 includes the severity level using which one or more alarms are ordered. As an example, in row R1, because the KPI value 702 and the KPI rank 704 worsened, and the client priority indicator 802 indicated "High," the alarm severity indicator 804 is "Urgent." Thus, by factoring in client priority indicator 802, a more targeted and important alarm may be raised, which is beneficial to the business.

Alarm Generator

Referring back to FIG. 6, the alarm generator 616 is configured to generate an alarm based on the alarm severity indicators 804 determined by the client priorities comparator 614. The alarm displays one or more KPIs with highest severity values. The KPI importance classifier 312 is further equipped with a transmitter (not shown in FIG. 6) that is configured to electronically communicate the generated alarm(s) to appropriate teams or personnel so that further action can be taken. The generated alarms are displayed on one or more display units accessible to the teams or personnel. Examples of display units include, but are not limited to, a desktop computer, a laptop, a personal digital assistant (PDA), a mobile phone, a smart-phone, a tablet computer, and the like. In an embodiment, the alarm is displayed on a dashboard or a portal and the teams/personnel may click on the displayed alarm to identify the associated trail of KPI ranks/values. In some embodiments, the display unit may be a part of the business performance system 110. The generated alarm can be displayed as at least one of an audio cue, a video cue, and a text cue. The alarm generation can be based on both push or pull mechanism. In push mechanism, the alarm is generated automatically in real-time, while in the pull mechanism a user (team/personnel) can specifically trigger the alarm generation.

Method Flowchart

Figure 9:
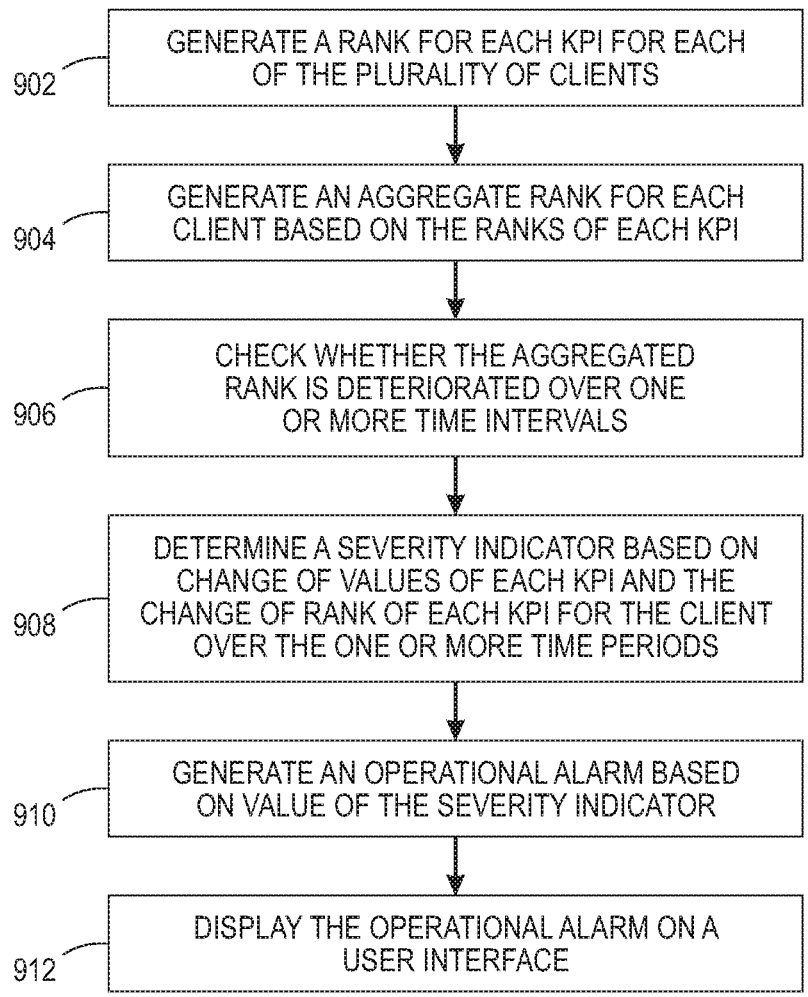
FIG. 9 illustrates a method for generating operational alarms for a plurality of clients, according to an embodiment of the disclosure.

FIG. 9 illustrates a method for generating operational alarms for a plurality of clients, according to an embodiment of the disclosure. To measure the quality of service rendered to each client, a plurality of KPIs is taken into account and their value is computed. Examples of KPIs include, but are not limited to, a utilization of employees ($K_1$), a productivity of employees ($K_2$), an average turnaround time of transaction ($K_3$), and a cost of operation ($K_4$). At 902, for each client, a rank for each KPI is generated. Therefore, for a client $C_1$, the value of $K_1$, $K_2$, $K_3$, and $K_4$ is calculated and a rank is assigned for each KPI. For example, for $K_1$, the client $C_1$ may have a rank of 2, while for $K_4$, the rank may be 15. For calculating the KPI based ranks, one or more weights previously assigned to each KPI may also be considered.

At 904, an aggregate rank is generated for each client. The aggregate rank takes into account the rank of a client across all KPIs. In an embodiment of the disclosure, a Kemeny rank aggregation method is used to determine the aggregate ranks. At 906, the aggregate rank for a client $C_1$ is monitored across one or more time periods (example, months, days, and the like). If a deterioration in the aggregate rank of $C_1$ is detected, at 908, a severity indicator is determined. The severity indicator is calculated based on change of values of each KPI and the change of rank of each KPI for the client $C_1$ over the one or more time periods. At 910, based on the value of the severity indicator, an operational alarm is generated. The value of the severity indicator may be "High," "Medium," or "Low." An operational alarm is generated when the severity indicator is "High" or "Medium." At 912, the operational alarm is displayed on a user interface of an administrator, a personnel, or an analyst. An example of the user interface is a dashboard or a portal. Further, the operational alarm displays one or more KPIs with highest severity values.

The method may be implemented using the business performance system 110 as discussed above. The business performance system 110 may be in the form of hardware, software or a combination of these. One or more of the modules 304, 306, 308, 310, 312 and 314 may be a part of the business process management server 102 or the business performance system 110.

Experimental Results

Experimental results are discussed below. However, it should be noted that these results should no way be interpreted to limit the scope of the disclosure. Operational data for 21 clients of a specific department of a business is considered. Further, four internal KPIs are used to monitor the operations of a given client. These KPIs are: (i) utilization of employees, (ii) productivity of employees, (iii) average turn-around-time (TAT) for a transaction, and (iv) cost of operation. The data set is spread across two months, namely, January and February of 2015.

Figure 10:
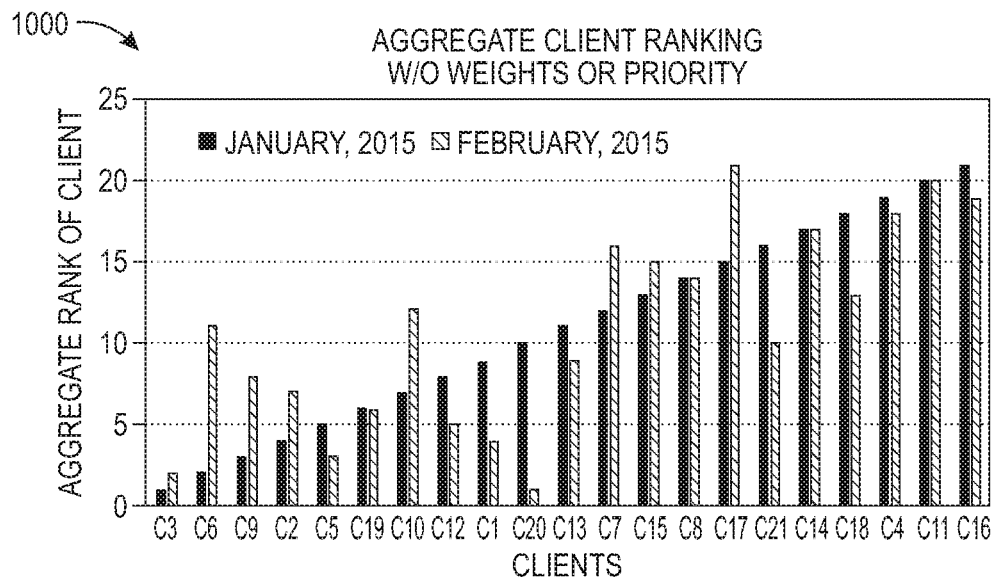
FIGS. 10-18 illustrate graphs and tables depicting the experimental results, according to various embodiments of the disclosure.

FIG. 10 illustrates a graph 1000 depicting an aggregate client ranking without weights on the KPIs or priorities on the ranking. For each client, the aggregate rank in January and February is compared and the clients are sorted according to their rank in January, 2015. As shown in the graph 1000, there are some clients for which the aggregate rank improved (e.g., $C_5$, $C_{12}$, $C_1$, $C_{20}$) in February, while there are others for which aggregate rank is deteriorated (e.g., $C_6$, $C_9$, $C_{10}$, $C_{17}$). The clients which slipped down in the aggregate rank will be analyzed to identify the responsible KPIs.

Figure 11:
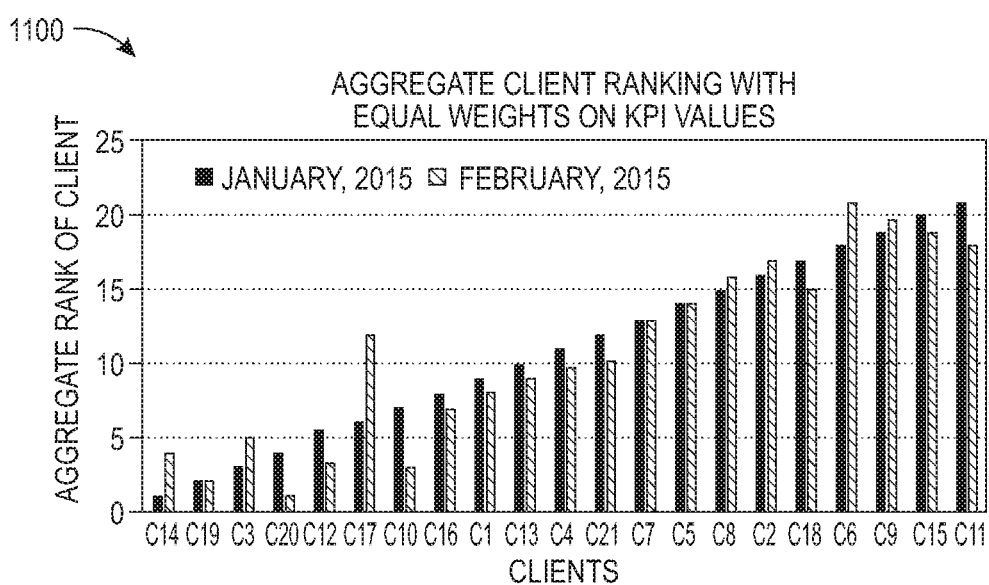

FIG. 11 illustrates a graph 1100 depicting the aggregate client ranking in January and February, where each client has a normalized weight (between 0 to 1) on the KPI values that is identical across all KPIs. A comparison of FIG. 10 and FIG. 11 reveals the impact of KPI weights. In January 2015, in absence of weights, clients $C_3$ and $C_{16}$ are ranked at the first and last position, respectively. The introduction of weights re-ordered the clients and, therefore, $C_{14}$ and $C_{11}$ are placed at the first and last position, respectively. Moreover, for client $C_{10}$, in absence of weights, the aggregate rank improved from January to February, while with the introduction of weights the aggregate rank deteriorated.

Figure 12:
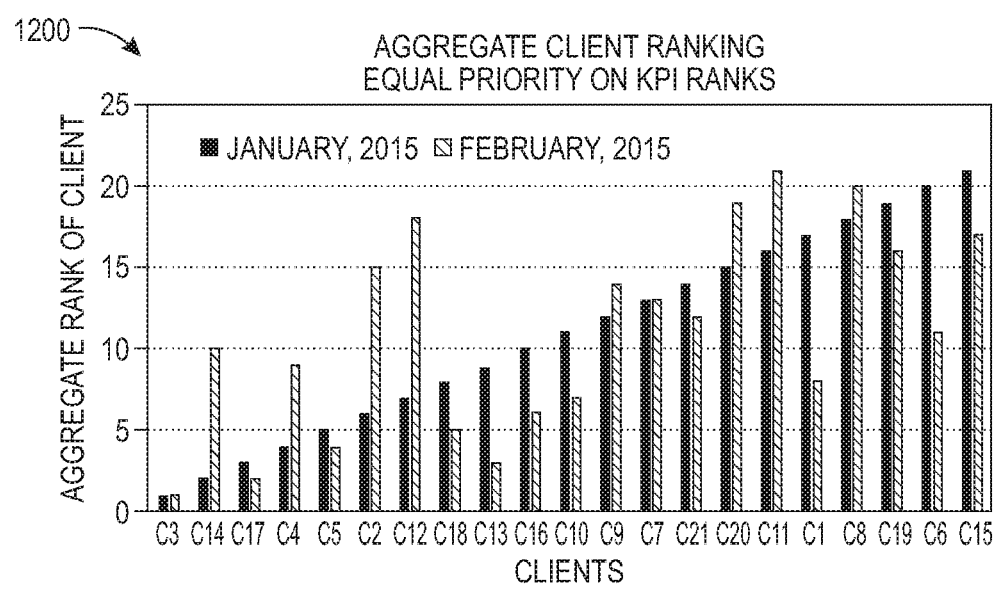

FIG. 12 illustrates a graph 1200 depicting the aggregate client ranking in January and February, where each KPI ranking has a normalized priority between 0 to 1 that is identical across all the clients. In this case, the KPI rank specific weights are: productivity=0:2, utilization=0:2, TAT=0:5, and cost=0:1.

Figure 13:
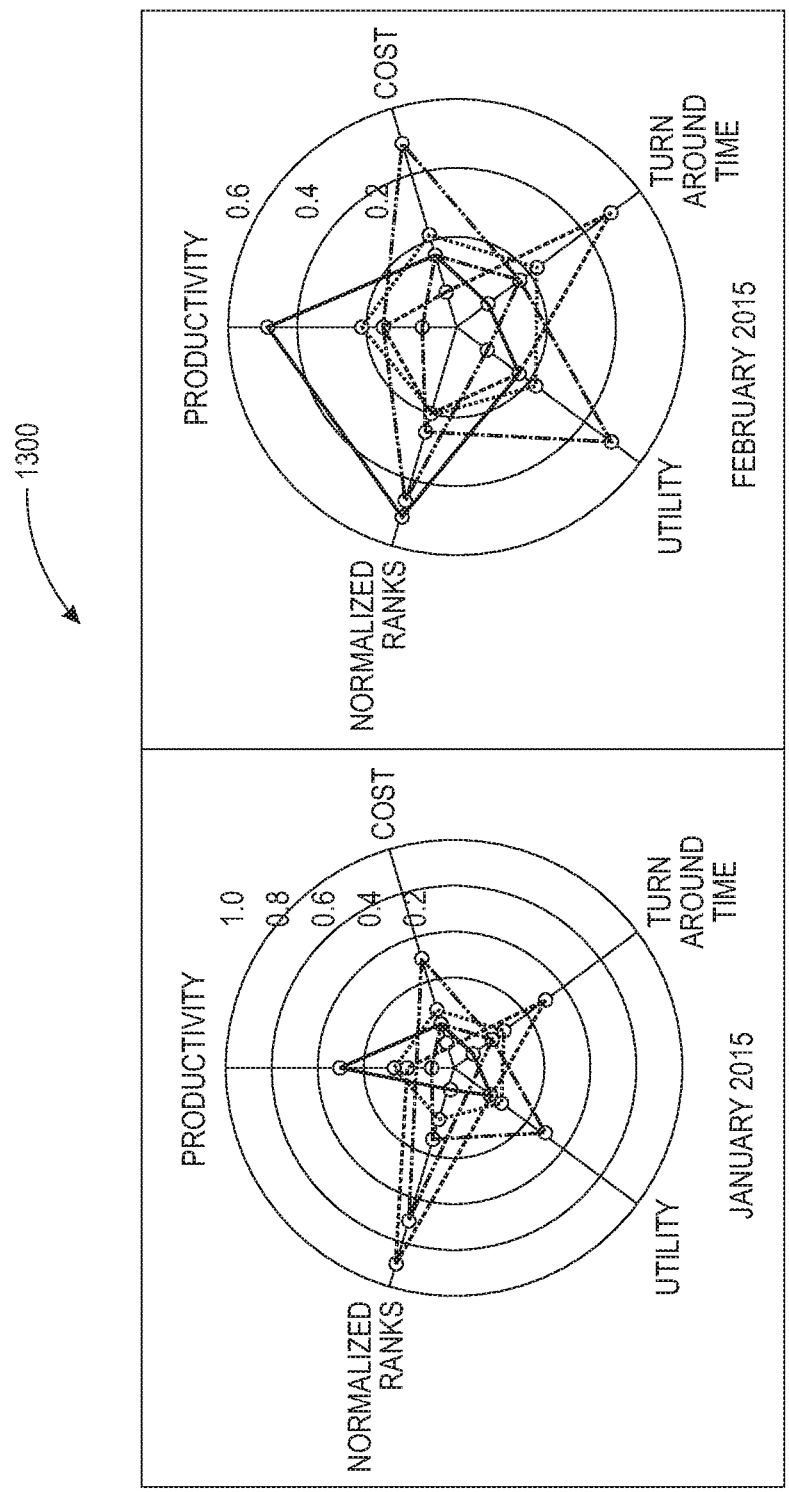

FIG. 13 illustrates a radar chart 1300 depicting the impact of varying priorities on the normalized aggregated rank. The graph shows a normalized aggregate rank (in a scale of 0 to 1) when KPI rank specific priorities are randomly (between 0 and 1) varied for the client $C_{14}$. A comparison of aggregate ranks of $C_{14}$ in FIGS. 10, 11 and 12 reveal the impact of priorities on the individual KPI rank.

Figure 14:
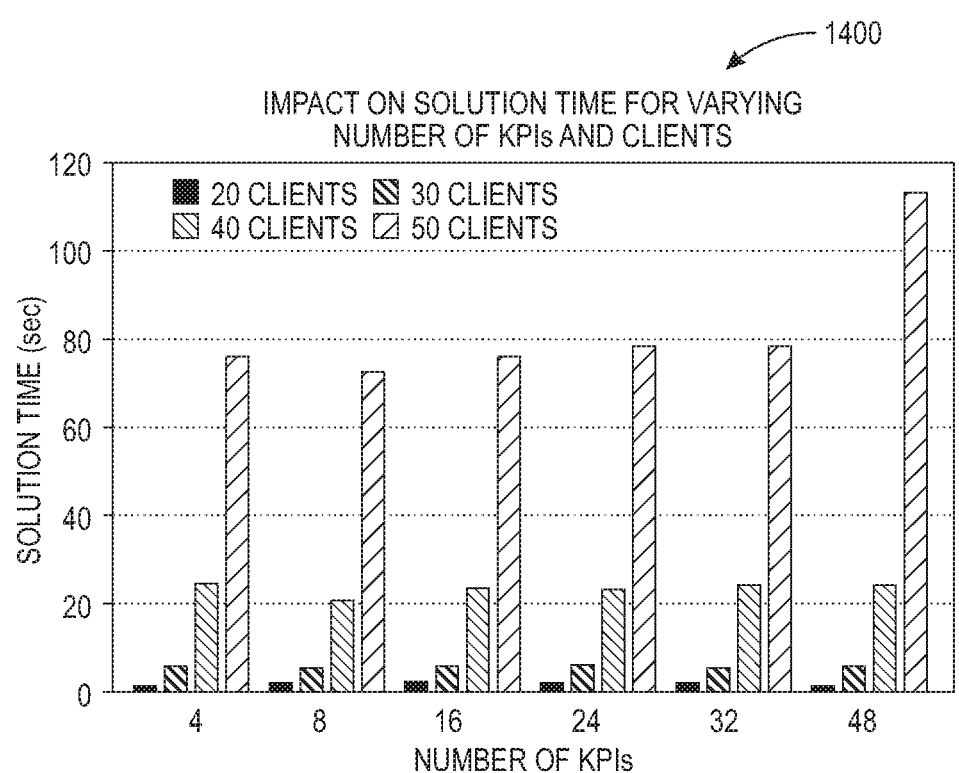

FIG. 14 illustrates a graph 1400 depicting the solution time with varying clients and KPIs. The solution time corresponds to the time taken to assign an aggregate rank to each client. The graph 1400 shows the average solution time when the number of clients and number of KPIs are varied. The impact of increasing the number of clients is more severe compared to the impact of increasing the number of KPIs.

Figures 15, 16:
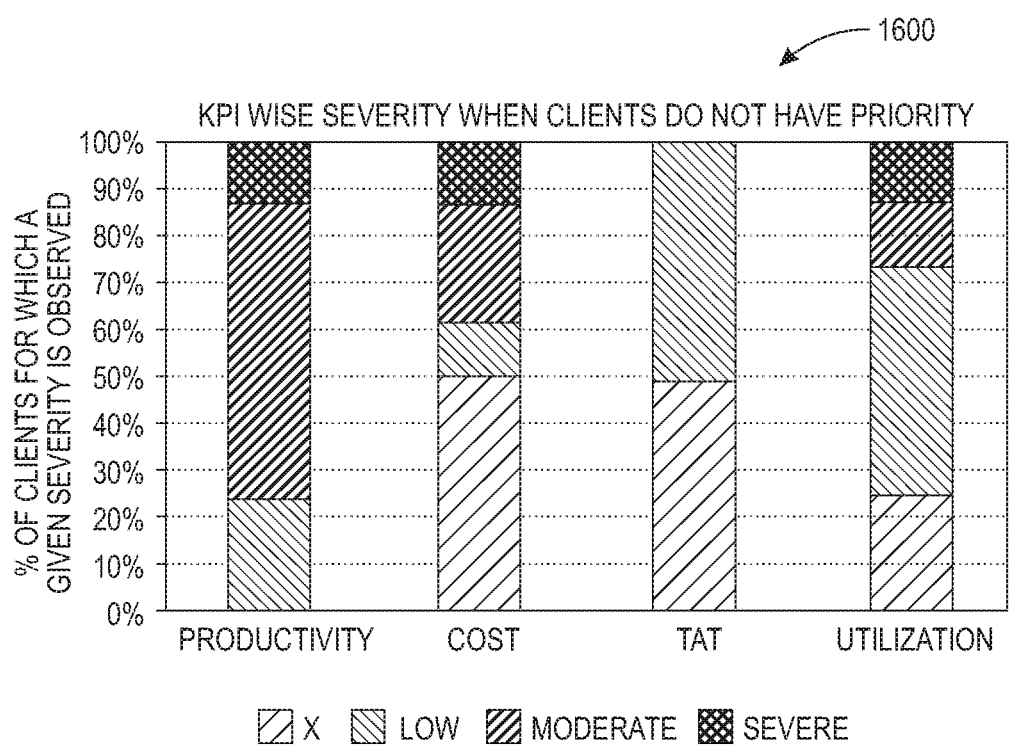

As shown in FIG. 10, there are 8 clients ($C_2$, $C_3$, $C_6$, $C_7$, $C_9$, $C_{10}$, $C_{15}$, and $C_{17}$) which slipped in their aggregate rank from the month of January 2015 to February 2015. For these clients, KPI importance classification approach is applied to identify the responsible KPIs for rank deterioration. FIG. 15 shows the client specific classification 1500 of KPIs in terms of severity for all the 8 clients. The symbol 'X' denotes that the KPI was least likely to be responsible for the rank deterioration. There are clients ($C_7$ and $C_9$) for which more than one KPI can be marked as not responsible. Thus, this approach of the disclosure helps in selecting the KPIs where organization should pay more attention in order to improve client operations. FIG. 16 illustrates a graph 1600 to depict the client specific classification of FIG. 15.

Figures 17, 18:
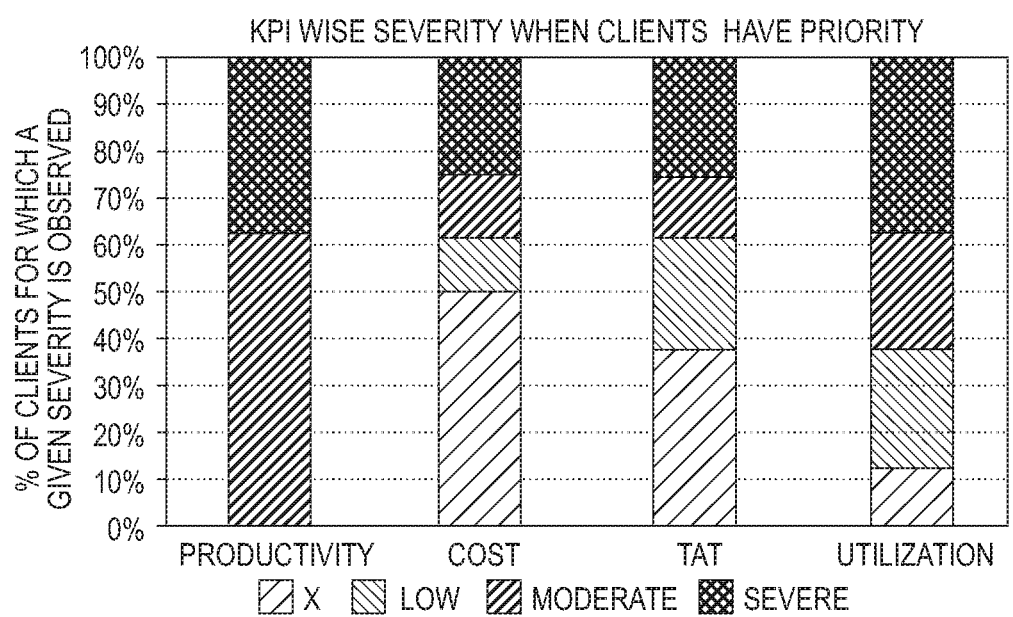

FIG. 17 shows the client specific classification 1700 of KPIs when the clients are randomly assigned a priority level (i.e., "High," "Medium," or "Low"). For low priority clients, KPI classification is same as the case when the client was treated with no priority (see FIG. 15). While in general, introduction of high and medium priority elevated the severity levels of KPIs (in most cases), for the high priority clients ($C_7$ and $C_9$), still there is at least one KPI (e.g., cost) which does not need to be looked at. This shows that the approach of this disclosure can detect the intrinsic trend of KPIs that are agnostic to the assigned priority levels. FIG. 18 illustrates a graph 1800 to depict the priority based client specific classification of FIG. 17.

The systems, methods and/or aspects discussed in the disclosure may be integrated with multiple solutions to augment their capabilities. Few such examples include BPO operations solutions, healthcare solutions, insurance services solutions, retail services solutions or other service delivery businesses. For a person skilled in the art, is understood that the disclosure may be implemented for any service sector where performance is measured based on one or more KPIs.

The present disclosure discloses methods and systems for analyzing operational efficiency of a business using rank aggregation of clients and rank monitoring over multiple time windows. The rank aggregation helps the business in understanding how a client is being served over time. The rank monitoring indicates which KPIs to improve on and thus, prevents client churn. The disclosure also enables a business leader to compare the performance of two clients for which actual operations may be very different. Additionally, the disclosure reduces effort and time needed to collate and compare disparate KPIs across multiple clients via a single pane of glass, i.e., the aggregate ranking of the clients. The present disclosure simplifies the decision making process while monitoring the client operations across the disparate KPIs.

The above description does not provide specific details of manufacture or design of the various components. Those of skill in the art are familiar with such details, and unless departures from those techniques are set out, techniques, known, related art or later developed designs and materials should be employed. Those in the art are capable of choosing suitable manufacturing and design details.

Note that throughout the following discussion, numerous references may be made regarding servers, services, engines, modules, interfaces, portals, platforms, or other systems formed from computing devices. It should be appreciated that the use of such terms are deemed to represent one or more computing devices having at least one processor configured to or programmed to execute software instructions stored on a computer readable tangible, non-transitory medium or also referred to as a processor-readable medium. For example, a server can include one or more computers operating as a web server, database server, or other type of computer server in a manner to fulfill described roles, responsibilities, or functions. Within the context of this document, the disclosed devices or systems are also deemed to comprise computing devices having a processor and a non-transitory memory storing instructions executable by the processor that cause the device to control, manage, or otherwise manipulate the features of the devices or systems.

Some portions of the detailed description herein are presented in terms of algorithms and symbolic representations of operations on data bits performed by conventional computer components, including a central processing unit (CPU), memory storage devices for the CPU, and connected display devices. These algorithmic descriptions and representations are the means used by those skilled in the data processing arts to most effectively convey the substance of their work to others skilled in the art. An algorithm is generally perceived as a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be understood, however, that all of these and similar terms are to be associated with the appropriate physical quantities and are merely convenient labels applied to these quantities. Unless specifically stated otherwise, as apparent from the discussion herein, it is appreciated that throughout the description, discussions utilizing terms such as "generating," or "monitoring," or "displaying," or "tracking," or "identifying," "or receiving," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The exemplary embodiment also relates to an apparatus for performing the operations discussed herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general-purpose systems may be used with programs in accordance with the teachings herein, or it may prove convenient to construct more specialized apparatus to perform the methods described herein. The structure for a variety of these systems is apparent from the description above. In addition, the exemplary embodiment is not described with reference to any particular programming language. It will be appreciated that a variety of programming languages may be used to implement the teachings of the exemplary embodiment as described herein.

The methods illustrated throughout the specification, may be implemented in a computer program product that may be executed on a computer. The computer program product may comprise a non-transitory computer-readable recording medium on which a control program is recorded, such as a disk, hard drive, or the like. Common forms of non-transitory computer-readable media include, for example, floppy disks, flexible disks, hard disks, magnetic tape, or any other magnetic storage medium, CD-ROM, DVD, or any other optical medium, a RAM, a PROM, an EPROM, a FLASH-EPROM, or other memory chip or cartridge, or any other tangible medium from which a computer can read and use.

Alternatively, the method may be implemented in transitory media, such as a transmittable carrier wave in which the control program is embodied as a data signal using transmission media, such as acoustic or light waves, such as those generated during radio wave and infrared data communications, and the like.

The terminology used herein is for the purpose of describing particular embodiments only and is not intended to be limiting of the disclosure. It will be appreciated that several of the above-disclosed and other features and functions, or alternatives thereof, may be combined into other systems or applications. Various presently unforeseen or unanticipated alternatives, modifications, variations, or improvements therein may subsequently be made by those skilled in the art without departing from the scope of the present disclosure as encompassed by the following claims.

The claims, as originally presented and as they may be amended, encompass variations, alternatives, modifications, improvements, equivalents, and substantial equivalents of the embodiments and teachings disclosed herein, including those that are presently unforeseen or unappreciated, and that, for example, may arise from applicants/patentees and others.

What is claimed is:

1. A computer-implemented method for generating operational alarms for a plurality of clients, the operational alarms being generated by a business performance system, each client being associated with a plurality of Key Performance Indicators (KPIs), wherein a value of each KPI indicates a quality of service rendered to each client, the computer-implemented method comprising:

generating, by a business process management server, a rank for each KPI for each of the plurality of clients based on inputs including client records, the KPI values, and weights on the KPI values, and generating an output including ordered rank lists for each KPI;

receiving over a network at a processor of the business performance system, the ordered rank lists for each KPI and priority values for the KPIs from the business process management server;

generating, by the processor of the business performance system, an aggregate rank for each client, thereby reducing a time required to collate and compare disparate KPIs across the clients, the aggregate rank based on the ordered rank lists for each KPI, wherein generating the aggregate rank includes selecting and applying one aggregation type from a set of three aggregation types, the set of three aggregation types including a first aggregation type utilized when no priority value attaches to the KPIs, a second aggregation type utilized when the priority values of the KPIs are non client-specific, and a third aggregation type when the KPIs include a client-specific priority value;

for each client:
monitoring, by the processor of the business performance system, the aggregate rank of the client over one or more time periods;

comparing the aggregate rank over the one or more time periods with historical aggregate ranks retrieved by the business performance system from a historical database;

if the aggregate rank deteriorates over the one or more time periods, determining, by the processor of the business performance system, the one or more KPIs responsible for the deterioration and a severity indicator based on change of value of each KPI and change of rank of each KPI for the client over the one or more time periods, the severity indicator having a high, medium, or low value;

automatically generating in real time, by the processor of the business performance system, an operational alarm based on value of the severity indicator when the high or medium value of the severity indicator is detected;

electronically communicating the operational alarm over a network to a device having a display via a push mechanism; and displaying, by the processor of the business performance system, the operational alarm on a dashboard of a user interface of the display, wherein the operational alarm includes a text cue and displays one or more KPIs with highest severity values and is selectable, such that clicking on the text cue enables display of an associated trail of the KPI ranks and the KPI values.

2. The computer-implemented method of claim 1, wherein the rank for each KPI for each client is generated by sorting the plurality of clients based on values of each KPI value and a weight assigned to each KPI.

3. The computer-implemented method of claim 1, wherein generating the aggregate rank for each client comprises generating the aggregate rank for each client using a Kemeny rank aggregation method for KPIs.

4. The computer-implemented method of claim 3, wherein the Kemeny rank aggregation method comprises evaluating a priority value assigned to each KPI, while generating the aggregate rank for each client.

5. The computer-implemented method of claim 1, wherein the plurality of KPIs comprises at least one of a utilization of employees, a productivity of employees, an average turnaround time (TAT) of transaction, and a cost of operation.

6. The computer-implemented method of claim 1, wherein the value of each KPI, the rank of each KPI, and the aggregate rank for each client is stored in the database for subsequent retrieval.

7. The computer implemented method of claim 1, wherein the generated alarm is a video alarm displayed on the dashboard of the computing device and is used by one or more business teams to take one or more actions.

8. A business performance system for generating operational alarms for a plurality of clients, each client being associated with a plurality of Key Performance Indicators (KPIs), wherein value of each KPI indicates a quality of service rendered to each client, the system comprising:

a rank aggregator implemented by a processor of a business performance system to:
receive a rank for each KPI for each of the plurality of clients, the rank generated based on inputs including client records, the KPI values, and weights on the KPI values, and generating an output including ordered rank lists for each KPI;

receive, over a network from a business process management server, the ordered rank lists for each KPI and priority values for the KPIs; and generate an aggregate rank for each client, thereby reducing a time required to collate and compare disparate KPIs across the clients, the aggregate rank based on the ranks of each KPI, wherein generating the aggregate rank includes selecting and applying one aggregation type from a set of three aggregation types, the set of three aggregation types including a first aggregation type utilized when no priority attaches to the KPIs, a second aggregation type utilized when the priority values of the KPIs are non client-specific, and a third aggregation type when the KPIs include a client-specific priority value; and a KPI importance classifier implemented by the processor of the business performance system to:
for each client:
track the aggregate rank of the client over one or more time periods;

compare the aggregate rank over the one or more time periods with historical aggregate ranks retrieved by the business performance system from a historical database;

if the aggregate rank deteriorates over the one or more time periods, determine the one or more KPIs responsible for the deterioration and a severity indicator based on change of value of each KPI and change of rank of each KPI for the client over the one or more time periods, the severity indicator having a high, medium, or low value;

automatically generate in real time, an operational alarm based on value of the severity indicator when the high or medium value of the severity indicator is detected;

electronically communicate the operational alarm over a network via a push mechanism to a device having a display; and display, by the processor of the business performance system, the operational alarm on a dashboard of a user interface on the display, wherein the operational alarm includes a text cue and displays one or more KPIs with highest severity values and is selectable, such that clicking on the text cue enables display of an associated trail of the KPI ranks and the KPI values.

9. The system of claim 8, wherein the rank aggregator is further configured to sort the plurality of clients based on values of each KPI value and a weight assigned to each KPI.

10. The system of claim 8, wherein the rank aggregator generates the aggregate rank for each client using a Kemeny rank aggregation method for KPIs.

11. The system of claim 10, wherein the Kemeny rank aggregation method further comprises evaluating a priority value assigned to each KPI, while generating the aggregate rank for each client.

12. The system of claim 8, wherein the database is a historical database for storing the value of each KPI, the rank of each KPI, and the aggregate rank for each client for subsequent retrieval.

13. A business performance system for evaluating business service performance rendered to a plurality of clients, the performance being evaluated based on a plurality of Key Performance Indicators (KPIs), wherein value of each KPI indicates a quality of service rendered to each client, the system comprising:
an aggregation component implemented by a processor of the business performance system to:
receive a rank for each KPI for each of the plurality of clients, the rank generated based on inputs including client records, the KPI values, and weights on the KPI values, and generating an output including ordered rank lists for each KP I;
receive, over a network from a business process management server, the ordered rank lists for each KPI and priority values for the KPIs; and
generate an aggregate rank for each client, thereby reducing a time required to collate and compare disparate KPIs across the clients, the aggregate rank based on the ranks of each KPI, the aggregate rank being generated using a Kemeny rank aggregation method, wherein the Kemeny rank aggregation method additionally uses the priority value assigned to each client while generating the aggregated rank, wherein generating the aggregate rank includes selecting and applying one aggregation type from a set of three aggregation types, the set of three aggregation types including a first aggregation type utilized when no priority value attaches to the KPls, a second aggregation type utilized when the priority values of the KPIs are non client-specific, and a third aggregation type when the KPIs include a client-specific priority value;
a KPI importance classifier implemented by the processor of the business performance system to:
for each client:
monitor the aggregate rank of the client over one or more time periods;
compare the aggregate rank over the one or more time periods with historical aggregate ranks retrieved from a historical database by the business performance system;
if the aggregate rank deteriorates over the one or more time periods, determine the one or more KPIs responsible for the deterioration and a severity indicator based on change of value of each KPI and change of rank of each KPI for the client over the one or more time periods, the severity indicator having a high, medium, or low value;
automatically generate, in real time, an operational alarm based on the value of the severity indicator when the high or medium value of the severity indicator is detected;
electronically communicate the operational alarm over a network via a push mechanism; and
a display unit configured to:
display the operational alarm on a dashboard of a user interface of a computing device, wherein the operational alarm includes a text cue and displays one or more KPIs with highest severity values and is selectable, such that clicking on the text cue enables display of an associated trail of the KPI ranks and the KPI values.

14. The system of claim 13, further comprising an integrated business process management server.

15. The system of claim 13 further comprising a client rank generator configured to: generate a rank for each KPI for each of the plurality of clients by:
multiplying the value of each KPI with a weight assigned to each KPI; and
sorting the multiplied values and assigning a rank to each client for each KPI.

16. The system of claim 13 wherein the database comprises a historical database configured to store the value of each KPI, the rank of each KPI, and the aggregate rank for each client for subsequent retrieval.

17. The system of claim 13, wherein the key performance indicators comprise utilization of employees, productivity of employees, average turnaround time, and/or cost of operation.

18. A business performance system for enhancing quality of service rendered to a plurality of clients, each client being associated with a plurality of Key Performance Indicators (KPIs), wherein value of each KPI indicates a quality of service rendered to each client, the business performance system comprising:
an aggregation component implemented by a processor of the business performance system to:
receive a rank for each KPI for each of the plurality of clients, the rank generated based on inputs including client records, the KPI values, and weights on the KPI values, and generating an output including ordered rank lists for each KPI;
receive, over a network from a business process management server, the ordered rank lists for each KPI and priority values for the KPIs; and
generate an aggregate rank for each client, thereby reducing a time required to collate and compare disparate KPIs across the clients, the aggregate rank based on ranks of each KPI, the aggegate rank being generated using a Kemeny rank aggregation method, wherein the Kemeny rank aggregation method additionally uses the priority value assigned to each client while generating the aggregated rank, wherein generating the aggregate rank includes selecting and applying one aggregation type from a set of three aggregation types, the set of three aggregation types including a first aggregation type utilized when no priority value attaches to the KPIs, a second aggregation type utilized when the priority values of the KPIs are non client-specific, and a third aggregation type when the KPIs include a client-specific priority value; and a KPI importance classifier implemented by the processor of the business performance system to:

monitor the aggregate rank of the client over one or more time periods;

compare the aggregate rank of each client with their respective historical aggregate ranks retrieved by the business performance system from a historical database, the KPI importance classifier comprising:

- a rank comparator configured to compare individual KPI ranks for each client over a plurality of time windows based on a negative slip in the aggregate rank;
- a value comparator configured to determine if the aggregate rank deteriorates over the one or more time periods, the one or more KPIs responsible for the deterioration and a severity indicator based on change of value of each KPI and change of rank of each KPI for the client over the one or more time periods, the severity indicator having a high, medium, or low value;
- an alarm generator configured to automatically generate an operational alarm in real time based on the value of the severity indicators when the high or medium value of the severity indicator is detected; and
- a transmitter configured to electronically communicate the generated alarm over a network via a push mechanism to a device operated by one or more personnel for taking one or more action, the personnel viewing the generated alarm on a dashboard of a user interface of the device, wherein the alarm includes a text cue and displays one or more KPIs with highest severity values and is selectable, such that clicking on the text cue enables display of an associated trail of the KPI ranks and the KPI values.

19. The business performance system of claim 18 further comprising a client priorities comparator, configured to determine alarm indicators for the plurality of clients based on client priority indicators and the severity indicators of the plurality of clients as determined by the value comparator.

20. The business performance system of claim 18, wherein the generated alarm displays one or more KPIs with highest severity values.

21. The business performance system of claim 18, further comprising an integrated business process management server.

* * * * *